(12) United States Patent
Klein et al.

(10) Patent No.: US 9,328,614 B2
(45) Date of Patent: May 3, 2016

(54) METHOD OF MAKING A METAL REINFORCING PIECE

(75) Inventors: Gilles Charles Casimir Klein, Mery sur Oise (FR); Jean-Michel Patrick Maurice Franchet, Paris (FR); Gilbert Michel Marin Leconte, Ozoir la Ferriere (FR); Dominique Magnaudeix, Yerres (FR)

(73) Assignee: SNECMA, Paris (FR)

(*) Notice: Subject to any disclaimer, the term of this patent is extended or adjusted under 35 U.S.C. 154(b) by 267 days.

(21) Appl. No.: 13/980,412

(22) PCT Filed: Jan. 10, 2012

(86) PCT No.: PCT/FR2012/050067
§ 371 (c)(1),
(2), (4) Date: Jul. 18, 2013

(87) PCT Pub. No.: WO2012/101356
PCT Pub. Date: Aug. 2, 2012

(65) Prior Publication Data
US 2013/0294920 A1    Nov. 7, 2013

(30) Foreign Application Priority Data

Jan. 24, 2011    (FR) ...................................... 11 50532

(51) Int. Cl.
*F01D 5/14* (2006.01)
*B21D 53/78* (2006.01)
(Continued)

(52) U.S. Cl.
CPC ................ *F01D 5/147* (2013.01); *B21D 53/78* (2013.01); *B23K 15/0053* (2013.01);
(Continued)

(58) Field of Classification Search
CPC .... B21D 53/78; B23K 15/0053; B23K 15/06; B23K 20/021; B23K 26/0078; B23K 2201/006; B23K 2201/045; B23K 2203/14; B23P 15/04; F01D 5/005; F01D 5/147; F04D 2240/303; F04D 2240/304; Y02T 50/672; Y10T 29/49337; Y10T 29/49339
See application file for complete search history.

(56) References Cited

U.S. PATENT DOCUMENTS

| 4,010,530 A | 3/1977 | Delgrosso et al. |
| 5,694,683 A | 12/1997 | Teets et al. |

(Continued)

FOREIGN PATENT DOCUMENTS

| EP | 1 450 006 | 8/2004 |
| EP | 1 574 270 | 9/2005 |

(Continued)

OTHER PUBLICATIONS

U.S. Appl. No. 14/402,182, filed Nov. 19, 2014, Leconte, et al.

(Continued)

*Primary Examiner* — Alexander P Taousakis
(74) *Attorney, Agent, or Firm* — Oblon, McClelland, Maier & Neustadt, L.L.P.

(57) ABSTRACT

A metal reinforcing piece for mounting on a leading edge or trailing edge of a composite blade for a turbine engine is made by shaping two metal sheets, positioning them on either side of a core, assembling the two sheets together around the core under a vacuum, shaping them on the core by hot isostatic compression, and cutting them to separate the reinforcing piece and release the core. A predetermined roughness is given to at least a portion of the surface of the core and is transferred to a corresponding portion of an inside surface of the reinforcing piece by the hot isostatic compression.

9 Claims, 1 Drawing Sheet

(51) Int. Cl.
*B23P 15/04* (2006.01)
*B23K 15/00* (2006.01)
*B23K 15/06* (2006.01)
*B23K 20/02* (2006.01)
*B23K 26/00* (2014.01)
*F04D 29/02* (2006.01)
*F04D 29/32* (2006.01)

(52) U.S. Cl.
CPC .............. *B23K 15/06* (2013.01); *B23K 20/021* (2013.01); *B23K 26/0078* (2013.01); *B23P 15/04* (2013.01); *F04D 29/023* (2013.01); *F04D 29/324* (2013.01); *B23K 2201/006* (2013.01); *B23K 2201/045* (2013.01); *B23K 2203/14* (2013.01); *F05D 2240/303* (2013.01); *F05D 2240/304* (2013.01); *Y02T 50/672* (2013.01); *Y10T 29/49337* (2015.01)

(56) References Cited

U.S. PATENT DOCUMENTS

| | | | |
|---|---|---|---|
| 8,752,289 B2 * | 6/2014 | Jones | 29/889.71 |
| 8,782,887 B2 * | 7/2014 | Franchet et al. | 29/889.71 |
| 8,814,528 B2 * | 8/2014 | Iwasaki | 416/224 |
| 2004/0184921 A1 | 9/2004 | Schreiber | |
| 2005/0278950 A1 * | 12/2005 | Despreaux et al. | 29/889.71 |
| 2012/0317810 A1 * | 12/2012 | Klein et al. | 29/889.71 |
| 2013/0008027 A1 | 1/2013 | Franchet et al. | |
| 2013/0283586 A1 * | 10/2013 | Franchet et al. | 29/423 |
| 2013/0312261 A1 * | 11/2013 | Godon et al. | 29/889.71 |
| 2013/0333214 A1 * | 12/2013 | Godon et al. | 29/889.7 |
| 2013/0333215 A1 * | 12/2013 | Godon et al. | 29/889.71 |
| 2014/0193271 A1 * | 7/2014 | Dudon et al. | 416/241 R |
| 2015/0086377 A1 * | 3/2015 | Leconte et al. | 416/224 |
| 2015/0104299 A1 * | 4/2015 | Briend et al. | 415/200 |
| 2015/0104323 A1 * | 4/2015 | Franchet et al. | 416/223 R |

FOREIGN PATENT DOCUMENTS

| | | |
|---|---|---|
| FR | 2 319 008 | 2/1977 |
| WO | 94 23890 | 10/1994 |
| WO | 2009 039282 | 3/2009 |
| WO | 2011 114073 | 9/2011 |

OTHER PUBLICATIONS

U.S. Appl. No. 13/978,809, filed Jul. 9, 2013, Franchet, et al.
International Search Report Issued Mar. 23, 2012 in PCT/FR12/50067 Filed Jan. 10, 2012.

* cited by examiner

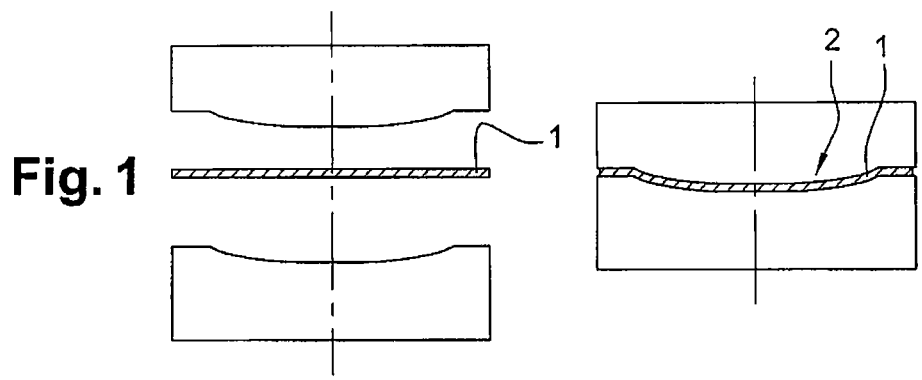
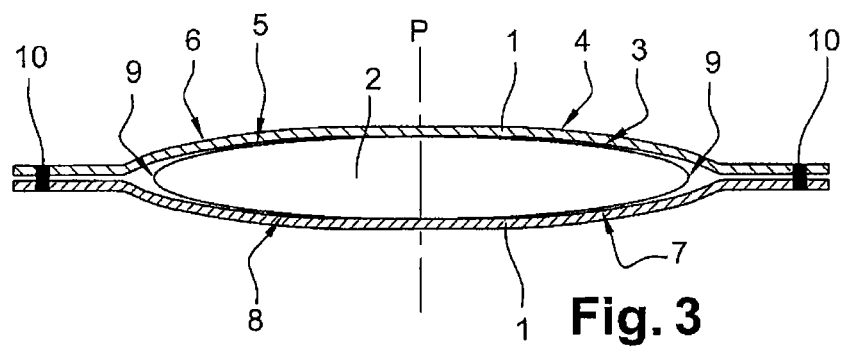
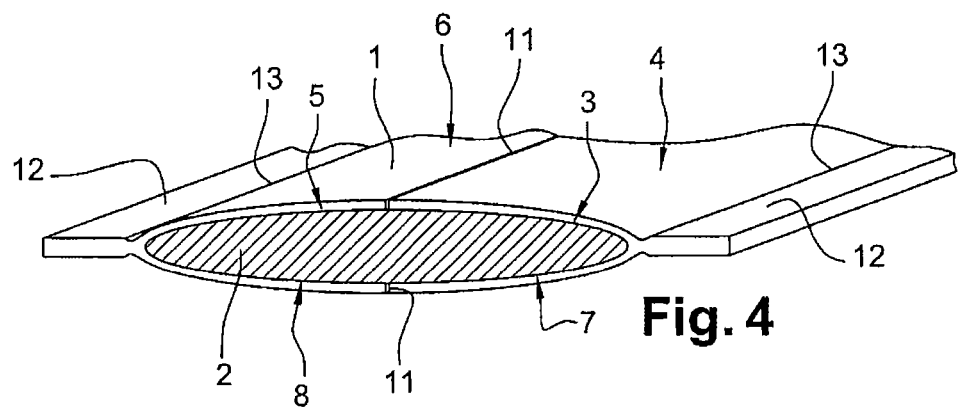
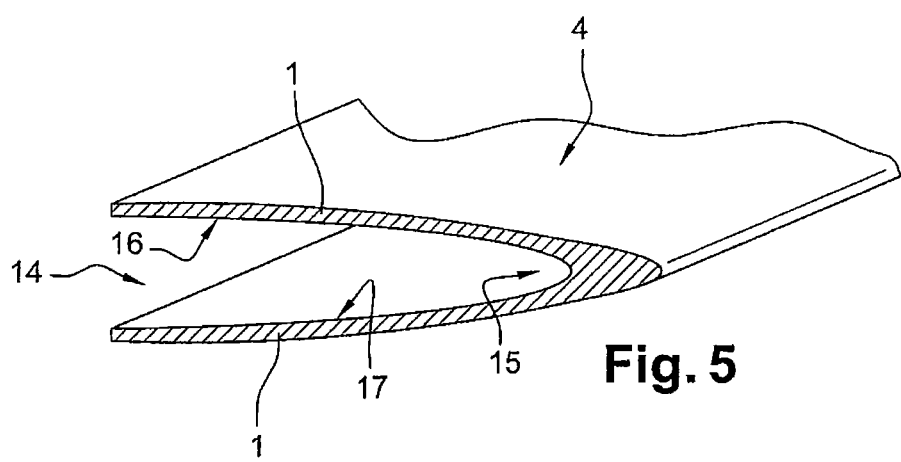

METHOD OF MAKING A METAL REINFORCING PIECE

The present invention relates to a method of making a metal reinforcing piece that is for mounting on the leading edge or on the trailing edge of a composite material blade for a turbine engine, such as a fan blade of an airplane turboprop or turbojet.

In order to reduce the weight and the cost of turbine engine fan blades, they are generally made out of composite material. Fan blades need to be capable of withstanding high levels of stress and impact, given their speeds of rotation and impacts against particles or foreign bodies that might penetrate in the air flow passage. For this purpose, composite material blades are protected at their leading and/or trailing edges by metal reinforcing pieces that are adhesively bonded to the airfoils of the blades.

Document EP 1 574 270-A1, in the name of the applicant, describes a method of making a reinforcing piece by diffusion bonding and superplastic forming (SPF/DB), the method comprising the steps consisting in:
  bonding the two metal sheets together by diffusion bonding in order to obtain a preform, a portion of the sheets being covered in an anti-diffusion substance in order to avoid them bonding in determined zones;
  curving and twisting the preform;
  inflating the preform so that it is subjected to superplastic forming; and
  cutting the preform in order to obtain the reinforcing piece.

That method does not make it possible to control accurately the inside shape of the cavity in the reinforcing piece. In particular, the junction zones between the sheets form zones of stress concentration and of rupture starters that weaken the reinforcement.

In order to improve the mechanical strength of the reinforcement, patent application FR 10/51992, filed by the applicant and not yet published, proposes a method of making a metal reinforcing piece that consists in:
  shaping two metal sheets by die stamping in order to cause them to approximate the final shape of the reinforcing piece that is to be made;
  positioning the two sheets on either side of a core reproducing the inside shapes of the suction and pressure sides of the reinforcing piece;
  assembling the two sheets together around the core in sealed manner under a vacuum;
  shaping the sheets onto the core by hot isostatic compression; and
  cutting the sheets to separate the reinforcing piece and release the core.

The hot isostatic compression of the sheets serves to shape the sheets to match the shape of the core and to obtain a large radius of curvature in the junction zone between the sheets, thereby avoiding any zone of stress concentration or of rupture starters.

The inside wall of the reinforcing piece, forming its pressure and suction side surfaces that are to be adhesively bonded respectively on the pressure side and to the suction side of the blade in the vicinity of its leading edge or its trailing edge, are subjected to an additional machining operation prior to applying adhesive with the purpose of imparting greater roughness thereto, so as to obtain better adhesion of the reinforcement on the blade.

That machining operation is complex, since the tool needs to penetrate into the narrow internal cavity of the reinforcing piece as defined by its pressure side and suction side surfaces.

A particular object of the present invention is to provide a solution to this problem that is simple, effective, and inexpensive.

To this end, the invention provides a method of making a metal reinforcing piece for mounting on the leading edge or the trailing edge of a composite material blade of a turbine engine, the method comprising the steps consisting in:
  shaping two metal sheets to approximate the final shape of the reinforcing piece that is to be made;
  positioning the two sheets on either side of a core reproducing the inside shapes of the suction and pressure sides of the reinforcing piece;
  assembling the two metal sheets together around the core in sealed manner under a vacuum;
  shaping the sheets onto the core by hot isostatic compression; and
  cutting the sheets to separate the reinforcing piece and release the core;
the method being characterized in that it consists in giving non-zero predetermined roughness to at least a portion of the surface of the core and in transferring this roughness to a corresponding portion of the inside surface of the reinforcing piece by hot isostatic compression.

In this way, the roughness of the core is directly "printed" on the inside surfaces of the pressure and suction sides of the reinforcing piece. The above-mentioned additional machining operation is no longer needed, thus making it possible to reduce the duration and the cost of making the reinforcing piece.

Advantageously, at least a portion of the surface of the core has roughness Ra greater than 3 micrometers ($\mu m$), and preferably lying in the range 3.2 $\mu m$ to 6.4 $\mu m$.

After separating the reinforcing piece, the core may be reused for other manufacturing cycles.

Such roughness, once transferred onto the inside surfaces of the pressure and suction sides of the reinforcing piece enable the adhesive to obtain good grip.

In one possibility of the invention, the outside surface of the core includes zones of different roughnesses.

The use of a plurality of zones of different roughnesses may be necessary in certain applications.

The roughness of the outside surface of the core may be obtained by milling, by mechanical shot peening, by sand blasting, by laser machining, by electro-corrosion, and/or by chemical machining.

In preferred manner, the core is made of a metal refractory material, e.g. a nickel alloy, or it is made of ceramic, and it is passivated by being covered in an anti-diffusion barrier that is not contaminating for the metal material of the sheets, e.g. a barrier obtained by depositing an oxide, e.g. yttrium oxide, or by forming an oxidation layer by heat treatment.

This prevents the sheets from adhering to the core during the hot isostatic compression.

The sheets may be made of titanium-based alloy, e.g. of TA6V.

Such a material is easily shaped at temperatures of about 940° C., and at low temperatures it is capable of withstanding high levels of stress or of impacts against particles or foreign bodies.

According to a characteristic of the invention, the sheets are shaped prior to being positioned on either side of the core by die stamping.

According to another characteristic of the invention, the two sheets are assembled together by electron beam (EB) welding.

Advantageously, the core has a first face with one half reproducing the inside shape of the pressure side of a first reinforcing piece and another half reproducing the inside shape of the suction side of a second reinforcing piece, the core also having a second face opposite to the first face and having one half that reproduces the inside shape of the suction side of the first reinforcing piece, and another half that reproduces the inside shape of the pressure side of the second reinforcing piece, the two reinforcing pieces being separated from each other by cutting after the sheets have been shaped on the core by hot isostatic compression. It is thus possible to make two reinforcing pieces on each manufacturing cycle, while using a single core, thereby reducing the cost of fabricating reinforcing pieces.

The invention also provides a blade for a turbine engine, such as an airplane turboprop or turbojet, the blade being characterized in that it has an airfoil of composite material presenting pressure and suction side surfaces that are connected together via trailing and leading edges, the blade being characterized in that it includes at least one reinforcing piece obtained by the above-described method, the reinforcing piece having two opposite inside surfaces adhesively bonded onto the pressure and suction side surfaces at the leading or trailing edges of the airfoil, and each presenting at least a portion having roughness Ra greater than 3 μm, and preferably lying in the range 3.2 μm to 6.4 μm.

The invention can be better understood and other details, characteristics, and advantages of the invention appear on reading the following description made by way of nonlimiting example and with reference to the accompanying drawing, in which:

FIGS. 1 and 2 are diagrams showing the step of shaping metal sheet in the method of the invention;

FIG. 3 is a diagram showing a step of assembling metal sheets around the core;

FIG. 4 is a diagram showing the step of shaping sheets on the core by hot isostatic compression and the step of cutting the sheets in order to separate the reinforcement and release the core; and FIG. 5 is a perspective view of a reinforcing piece obtained by executing a method of the invention.

FIG. 1 shows a step of hot die stamping metal sheet 1 in order to shape it so that it approximates the final shape of the reinforcing piece that is to be made. At the end of this shaping, each metal sheet 1 has a concave zone 2 defining a recess. The metal sheet 1 may be made of a titanium-based alloy, e.g. TA6V. The shaping step is performed at a temperature of about 940° C.

As shown in FIG. 3, two identical metal sheets 1 are then placed facing each other on either side of a core 2, the concave sides of the sheets 1 each housing a respective portion of the core 2.

The core 2 presents a plane of symmetry P perpendicular to the sheets and includes a first face having one half 3 reproducing the inside shape of the pressure side of a first reinforcing piece 4 that is to be made, and another half 5 reproducing the inside shape of the suction side of a second reinforcing piece 6 that is to be made. The core 2 also has a second face, opposite from the first face, and having one half 7 reproducing the inside shape of the suction side of the first reinforcing piece 5, and another half 8 reproducing the inside shape of the pressure side 3 of the second reinforcing piece 6.

The connection zones 9 between the two faces, i.e. the side edges of the core 2, have a radius lying in the range 2 millimeters (mm) to 6 mm.

The core 2 is made of a refractory material into which titanium does not diffuse, and of a metal alloy presenting a coefficient of expansion that is very different from that of the titanium sheets 1, e.g. IN100.

The purpose is to avoid any adhesion between the metal sheets 1 and the core 2 during the various operations that are performed, and in particular during the operation of hot isostatic compression.

Also for this purpose, the core 2 may be activated by being covered in an anti-diffusion barrier that is not contaminating for the metal material of the sheets, which barrier may be obtained by depositing an oxide, e.g. yttrium oxide, or by forming an oxidation layer by heat treatment.

Beforehand, the faces of the core 2 are treated or machined in such a manner as to impart a determined degree of roughness thereto, for example roughness Ra greater than 3 μm, and preferably lying in the range 3.2 μm to 6.4 μm.

The roughness of the outside surface of the core 2 may be obtained by milling, by a mechanical shot peening, by sand blasting, by laser machining, by electro-corrosion, and/or by chemical machining.

If necessary, the outside surface of the core 2 may include zones with different roughnesses.

Once the sheets 1 have been put into place around the core 2, they are assembled together at their periphery by tack welding (not shown in the figures) and by tungsten inert gas (TIG) welding in order to be bonded together and held in position. The assembly is then placed in an evacuated enclosure in order to weld the sheets 1 together over their entire periphery, e.g. by electron beam (EB) welding. The continuous peripheral weld bead 10 provides sealing for the cavity formed between the sheets 1.

As shown in FIG. 3, the sheets 1 are then shaped on the core 2 by hot isostatic compression, during which the sheets 1 are subjected to an external pressure of about 1000 bars at a temperature of about 940° C., and for a duration of about 3 hours, assuming that the sheets 1 are made of TA6V titanium alloy.

During this operation, the sheets 1 deform so as to reproduce accurately the shape of the core 2, including in the connection zones 9 of the core 2. In the zones in particular, the sheets 1 join together while fitting closely to the rounded shape of the core 2.

During this step, the roughness of the core 2 is transferred or "printed" on the inside surfaces of the sheets 1 that are in contact with the rough core 2.

In parallel, because of the high temperature, the two sheets 1 are welded together by diffusion bonding.

Thereafter, the two reinforcing pieces 4, 6 are separated by cutting the sheets 1 along the lines 11 situated at the intersection between said sheets and the plane of symmetry P.

The excess peripheral material 12 is removed by cutting away along trimming lines 13. Finally, finishing machining serves to give the desired outside shape to the reinforcing pieces 4, 6.

Two reinforcing pieces are thus obtained, each presenting a shape as shown in FIG. 5, in which the junction between the two sheets 1, made by diffusion bonding, ensures mechanical characteristics that are equivalent to the characteristics of a part made as a single piece. The cavity 14 of each reinforcing piece also includes a radius of curvature in the junction zone 15 between the pressure side 16 and the suction side 17 that is large enough to avoid generating stress concentrations and cracks in use.

Finally, the inside surfaces 16 and 17 of the cavity 14 present sufficient roughness to enable the reinforcing piece 4, 6 to be adhesively bonded on a leading edge or a trailing edge of a composite material blade, e.g. using an epoxy type adhesive.

The core 2 may be reused for making other reinforcing pieces.

The invention claimed is:

1. A method of making a metal reinforcing piece to mount on a leading edge or trailing edge of a composite material blade of a turbine engine, the method comprising:
   shaping two metal sheets to approximate a final shape of the reinforcing piece that is to be made;
   positioning the two sheets on either side of a core;
   assembling the two metal sheets together around the core in a sealed manner under a vacuum;
   compressing the sheets onto the core by hot isostatic compression to reproduce inside shapes of suction and pressure sides of the reinforcing piece;
   cutting the sheets to separate the reinforcing piece and release the core; and
   giving non-zero predetermined roughness to at least a portion of the surface of the core and transferring the roughness to a corresponding portion of an inside surface of the reinforcing piece by hot isostatic compression.

2. A method according to claim 1, wherein at least a portion of the surface of the core has roughness Ra greater than 3 µm, or in a range of 3.2 µm to 6.4 µm.

3. A method according to claim 1, wherein an outside surface of the core includes zones of different roughnesses.

4. A method according to claim 1, wherein the roughness is on an outside surface of the core and is obtained by at least one of milling, mechanical shot peening, sand blasting, laser machining, electro-corrosion, and chemical machining.

5. A method according to claim 1, wherein the core is made of a metal refractory material, or an alloy of titanium or of nickel, and is passivated by being covered in an anti-diffusion barrier that is not contaminating for the metal material of the sheets, or a barrier of yttrium oxide.

6. A method according to claim 1, wherein the sheets are made of a titanium-based alloy, or of TA6V.

7. A method according to claim 1, wherein the sheets are shaped prior to being positioned on either side of the core by die stamping.

8. A method according to claim 1, wherein the sheets are assembled together by electron beam welding.

9. A method according to claim 1, wherein the core includes a first face with one half reproducing the inside shape of the pressure side of a first reinforcing piece and another half reproducing the inside shape of the suction side of a second reinforcing piece, the core also including a second face opposite to the first face and including one half that reproduces the inside shape of the suction side of the first reinforcing piece, and another half that reproduces the inside shape of the pressure side of the second reinforcing piece, the two reinforcing pieces being separated from each other by cutting after the sheets have been shaped on the core by hot isostatic compression.

* * * * *